Jan. 22, 1963 K. M. MELISS 3,074,856
APPARATUS FOR SEPARATING PARAFFIN WAX FROM
MIXTURES OF WAX AND HYDROCARBON OILS
Filed Feb. 24, 1955
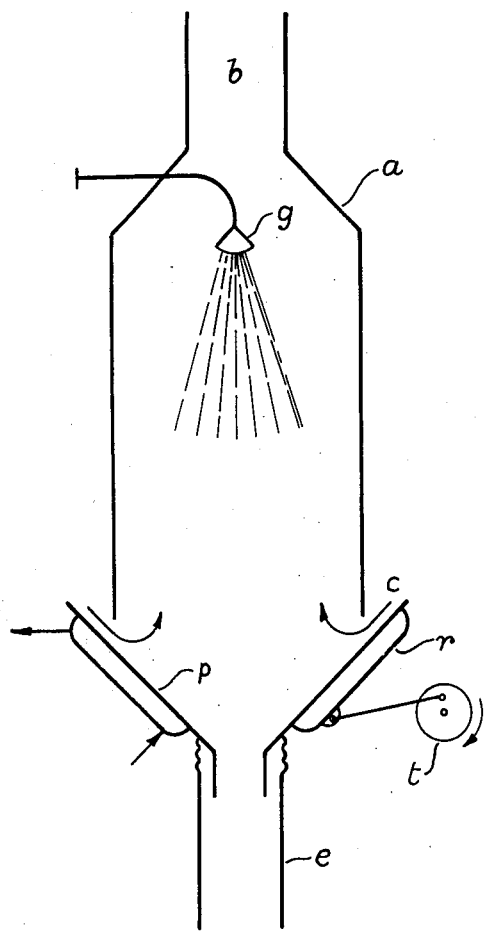
INVENTOR
BY
ATTORNEYS.

United States Patent Office 3,074,856
Patented Jan. 22, 1963

3,074,856
APPARATUS FOR SEPARATING PARAFFIN WAX FROM MIXTURES OF WAX AND HYDROCARBON OILS
Kurt Martin Meliss, Frankfurt am Main, Germany, assignor to Edeleanu Gesellschaft m.b.H., Frankfurt am Main, Germany, a corporation of Germany
Filed Feb. 24, 1955, Ser. No. 490,303
Claims priority, application Germany Feb. 26, 1954
2 Claims. (Cl. 196—14.5)

In United States patent application Serial No. 380,206 of Alfred Hoppe et al., filed on September 15, 1953, now Patent No. 3,019,179, is described a process for separating paraffin wax from mixtures of wax and hydrocarbon oils, for example, from wax-containing hydrocarbon oils, wherein the wax-oil mixture is sprayed at a temperature above its pour point into a gaseous medium of which the temperature is at least 10 degrees centigrade below the pour point of the mixture. In this manner a granular mixture of crystallised paraffin wax and liquid oil is formed, and the granular mixture is stirred with a solvent at a temperature below the melting point of the wax to be separated, whereby the oil dissolves and the solid wax can be separated mechanically from the oil solution.

The aforesaid application also describes apparatus adapted for carrying out the process described above, which comprises a tower, inlets for the gaseous medium arranged in the lower part of the tower round the circumference thereof, nozzle means within the tower for spraying the wax-oil mixture into the gaseous medium, and a floor at the base of the tower for collecting the deposited wax and having a discharge opening therein. The gaseous medium is passed through the tower in countercurrent to the sprayed mixture, and leaves the tower through a chimney at the upper end thereof. The floor of the tower may be provided with cooling means, and the discharge of the granular mixture through the opening in the floor may be assisted by scraping means.

It has been found that in many cases it is difficult to remove the granular mixture from the tower completely by the means described in the aforesaid specification.

The present invention provides apparatus for use in separating wax from a mixture of wax and oil, which comprises a tower, nozzle means in the upper part of the tower for spraying the wax-oil mixture into a gaseous medium within the tower, a funnel spaced from the lower edge of the wall of the tower to form an annular opening for introducing a gaseous medium into the tower in countercurrent to the finely divided particles of the sprayed wax-oil mixture and adapted for receiving and discharging the deposited material, and means for imparting a shaking movement to the funnel. The latter shaking means causes the granular mixture to slide down the wall of the funnel and be discharged therefrom, and the spacing of the funnel from the lower edge of the wall of the tower serves the dual purpose of permitting the funnel to perform shaking movements and of admitting the gaseous medium into the tower.

Advantageously, the wall of the funnel is provided with cooling means. In this manner sintering and agglomeration of the granular particles on the wall of the funnel is avoided. For the same reason it is of advantage also to provide the wall of the tower with cooling means.

An example of an apparatus constructed in accordance with the invention is shown diagrammatically in the accompanying drawing:

In the drawing a tower $a$ has within it a spraying nozzle $g$, through which a wax-containing oil may be introduced into the tower, and terminates at its upper end in a narrow portion $b$, which acts as a chimney. Air or another gas enters the tower through an annular opening $c$. The tower has at its lower end a funnel $p$, which forms the base of the tower, and the space between the lower edge of the side wall of the tower and the wall of the funnel forms the annular opening $c$ for introduction of the gaseous medium. The wall of the receiving funnel $p$ is provided with a cooling jacket or cooling pockets $r$.

The funnel $p$ is coupled to a shaking device $t$ of any desired construction, and is oscillated thereby at a suitable frequency. The oscillating motion may be produced mechanically, for example, by means of an eccentric; or pneumatically, for example, by means of an unbalanced turbine or a shaking motor; or electrically, for example, by electromagnetic means; or by supersonic means.

Due to the cooling the granular mixture falling on to the inclined surface of the funnel $p$ does not adhere thereto, and due to the shaking motion it moves towards the lower opening of the funnel. From that opening it falls through the tube $e$ into a receiver (not shown), in which the granular mixture is treated with solvent.

I claim:
1. Apparatus for separating wax from a mixture of wax and oil, which comprises a tower open at the bottom and having a gas outlet in its upper part, nozzle means located within the upper part of the tower for spraying the wax-oil mixture downwardly into a gaseous medium within the tower, a downwardly narrowing funnel-shaped member which is located beneath the lower opening of the tower to collect material deposited therein and has an outlet in its base for the discharge of deposited material, the said funnel-shaped member being free to move relatively to the tower and spaced at its upper part from the lower extremity of the wall of the tower to form an annular inlet for introducing a gaseous medium into the tower through the lower opening thereof in countercurrent to the finely divided particles of the sprayed wax-oil mixture, and means for imparting a shaking movement to the funnel-shaped member.

2. Apparatus for separating wax from a mixture of wax and oil, which comprises a tower open ot the bottom and having a gas outlet in its upper part, nozzle means located within the upper part of the tower for spraying the wax-oil mixture downwardly into a gaseous medium within the tower, a downwardly narrowing funnel-shaped member which is located beneath the lower opening of the tower to collect material deposited therein and has an outlet in its base for the discharge of deposited material, the said funnel-shaped member being free to move relatively to the tower and spaced at its upper part from the lower extremity of the wall of the tower to form an annular inlet for introducing a gaseous medium into the tower through the lower opening thereof in countercurrent to the finely divided particles of the sprayed wax-oil mixture, means for imparting a shaking movement to the funnel-shaped member, and cooling means provided on the funnel-shaped member for cooling the wall thereof.

(References on following page)

References Cited in the file of this patent

UNITED STATES PATENTS

| | | |
|---|---|---|
| 1,277,935 | Hussey | Sept. 3, 1918 |
| 1,450,175 | Honsinger | Apr. 3, 1923 |
| 1,730,048 | Zizinia | Oct. 1, 1929 |
| 1,782,054 | Uhl | Nov. 18, 1930 |
| 1,926,519 | Foster | Sept. 12, 1933 |
| 2,051,545 | Collins | Aug. 18, 1936 |
| 2,062,374 | Noel | Dec. 1, 1936 |
| 2,073,388 | Elliott et al. | Mar. 9, 1937 |
| 2,116,144 | Dickinson | May 3, 1938 |
| 2,229,037 | Boldman | Jan. 21, 1941 |
| 2,312,006 | Thiele | Feb. 23, 1943 |
| 2,333,333 | Peebles et al. | Nov. 2, 1943 |
| 2,401,569 | Koch | June 4, 1946 |
| 2,631,969 | Klueger | Mar. 17, 1953 |

FOREIGN PATENTS

| | | |
|---|---|---|
| 709,956 | Great Britain | June 2, 1954 |